(12) United States Patent
Barr et al.

(10) Patent No.: US 7,146,511 B2
(45) Date of Patent: *Dec. 5, 2006

(54) RACK EQUIPMENT APPLICATION PERFORMANCE MODIFICATION SYSTEM AND METHOD

(75) Inventors: Andrew Harvey Barr, Roseville, CA (US); Kirk Michael Bresniker, Roseville, CA (US); Ricardo Espinoza-Ibarra, Lincoln, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 466 days.

This patent is subject to a terminal disclaimer.

(21) Appl. No.: 10/681,721

(22) Filed: Oct. 7, 2003

(65) Prior Publication Data

US 2005/0076251 A1   Apr. 7, 2005

(51) Int. Cl.
*G06F 1/26* (2006.01)
(52) U.S. Cl. .......................... 713/300; 702/85
(58) Field of Classification Search ................. 713/320
See application file for complete search history.

(56) References Cited

U.S. PATENT DOCUMENTS

| | | | |
|---|---|---|---|
| 4,851,965 A | | 7/1989 | Gabuzda et al. |
| 5,958,058 A * | | 9/1999 | Barrus ........................ 713/320 |
| 6,018,625 A | | 1/2000 | Hayball et al. |
| 6,148,335 A * | | 11/2000 | Haggard et al. ............ 709/224 |
| 6,578,064 B1 * | | 6/2003 | Saito et al. ................. 718/103 |
| 6,766,420 B1 * | | 7/2004 | Rawson, III ................ 711/133 |
| 6,785,592 B1 | | 8/2004 | Smith et al. |
| 6,836,849 B1 * | | 12/2004 | Brock et al. ................ 713/310 |
| 6,837,063 B1 | | 1/2005 | Hood, III et al. |
| 6,859,882 B1 * | | 2/2005 | Fung .......................... 713/300 |
| 6,952,782 B1 * | | 10/2005 | Staiger ....................... 713/300 |
| 6,986,069 B1 * | | 1/2006 | Oehler et al. ............... 713/320 |
| 2002/0049920 A1 | | 4/2002 | Staiger |
| 2002/0152305 A1 * | | 10/2002 | Jackson et al. ............. 709/224 |
| 2003/0005339 A1 * | | 1/2003 | Cohen et al. ............... 713/300 |
| 2003/0037092 A1 * | | 2/2003 | McCarthy et al. .......... 709/104 |
| 2004/0255171 A1 | | 12/2004 | Zimmer et al. |

FOREIGN PATENT DOCUMENTS

| | | |
|---|---|---|
| EP | 1096360 | 2/2001 |
| EP | 1182538 | 2/2002 |
| EP | 1182556 | 2/2002 |
| GB | 2342471 | 4/2000 |
| GB | 2393540 | 3/2004 |
| GB | 2404792 | 2/2005 |
| WO | WO 02/099639 A1 * | 12/2002 |

\* cited by examiner

*Primary Examiner*—Chun Cao

(57) ABSTRACT

A rack equipment application performance modification system and method is disclosed for providing a convenient and efficient manner to modify performance of rack equipment based upon an application. In one embodiment of the present invention, a rack equipment application performance modification system comprises rack equipment, an application performance modification component, and a communication bus. The rack equipment processes information. The application performance modification component modifies performance of said rack equipment based upon an application. The communication bus communicatively couples the rack equipment and the application performance modification component and the communication bus communicates information between the application performance modification component and the rack equipment.

19 Claims, 4 Drawing Sheets

RACK EQUIPMENT APPLICATION PERFORMANCE MODIFICATION SYSTEM AND METHOD

FIELD OF THE INVENTION

The present invention relates to rack equipment management.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data, ideas and trends in most areas of business, science, education and entertainment. Frequently, electronic systems designed to provide these advantageous results are realized through the leveraged utilization of centralized resources by distributed network nodes. While leveraged utilization of centralized resources is usually advantageous, allocation of centralized resource operations is usually very complex and often involves power consumption and heat dissipation limitations.

Centralizing certain resources within a distributed network typically provides desirable benefits. For example, centrally storing and/or processing information typically relieves the necessity of wasteful duplicative storage and/or processing resources at each remote networked node. However, managing large storage and processing capabilities of centralized resources is very complex and expensive. Clients interested in engaging a host to provide centralized resources and services typically have a desire to avoid providing the infrastructure, operation and maintenance directly themselves.

Centralized computing resource centers (e.g., server farms, Application Service Provider Centers, Internet Data Centers, Utility Data Centers, etc.) usually include a variety of equipment related to information processing mounted in racks. For example, a rack can include servers, routers, disk arrays, and operational support components (e.g., power distribution components, fans, etc.). The racks usually provide a convenient and efficient way to arrange computing equipment in a centralized operation location. The configuration of the rack structures usually follow conventional standards. However, the equipment mounted within a rack can vary dramatically and this diversity in rack equipment usually gives rise to a number operational concerns. For example, the different rack equipment also usually have different operating characteristics that can have various impacts on centralized resource operations.

In addition to operational characteristic differences, rack equipment are also often utilized to perform a variety of different applications. For example, some applications are associated with low priority tasks and/or do not require significant performance support. Other applications have a high priority and/or require significant performance support. Managing and maintaining the infrastructure to support numerous possible applications in a large and complicated centralized networked resource environment for a variety of different clients raises many challenging operational issues.

Traditional centralized resource environments usually have set infrastructure support parameters even though there is usually a wide variety of equipment and applications involved. For example, equipment racks usually have predetermined power consumption and thermal dissipation limits. The power consumption and thermal dissipation limitations are often referred to as the power and thermal "budget". The equipment in the racks is typically operated at a preset performance level that consumes a fixed amount of power and dissipates a fixed amount of heat. The amount of power consumed and heat dissipated by any particular piece of rack equipment is traditionally constant regardless of whether the benefit of the set predetermined performance level outweighs the impact of the power consumed and/or heat dissipated.

While the power consumed and the heat dissipated by a particular piece of rack equipment typically remains relatively constant, the applications running on any particular piece of equipment can vary over time. If the rack equipment is set predetermined anticipated average fixed performance level it can be inadequate to handle a complex or high "performance" application. Alternatively, if the application is a simple application the rack equipment can have significant resources sitting idle. Trying to predetermine an appropriate fixed performance level is also usually complicated by power and thermal budget concerns. The variety of different types of equipment typically included in centralized computing resource racks adds complexity in anticipating performance level settings that are compatible with cumulative power and thermal budget concerns. Further complicating the issue situations in which that more servers can be physically located or "housed" within a rack than can be cooled and power continuously provided within. The varying configuration of the rack equipment with different power and thermal profiles and the variety of possible applications with different performance requirements makes predetermining optimal settings very difficult.

Traditional attempts at addressing varying application performance requirements often introduce other complications. For example, some traditional approaches involve partially loading a rack in an effort to allocate more of a power thermal budget to fewer devices. However, in addition to potential for the rack equipment with fixed high performance setting to site idle during lower performance applications it also often results in consumption of expensive data center floor space since more equipment racks are required for the equipment. Traditional rack equipment settings are also sometimes set to permit rack equipment to run at relatively high temperatures, which usually increases the failure rate of the components housed in the equipment rack. Conversely, traditional attempts sometimes deploy more lower power rack equipment (e.g., servers) in an attempt to conserve floor space. However, the performance limited power rack equipment typically have restricted capacity and/or functionality that are impact high performance application results.

Traditional attempts at varying performance in conventional centralized resource centers are usually labor intensive and difficult. In addition, attempting to manually address problems that can arise is often complicated and the response time slow when compared to the speed at which application changes occur. Furthermore, many traditional rack equipment manual performance variation attempts do not promote efficient use of a power consumption and heat dissipation budget.

SUMMARY OF THE INVENTION

A rack equipment application performance modification system and method is disclosed for providing a convenient and efficient manner to modify performance of rack equipment based upon an application. In one embodiment of the present invention, a rack equipment application performance modification system comprises rack equipment, an application performance modification component, and a communication bus. The rack equipment processes information. The application performance modification component modifies performance of said rack equipment based upon an application. The communication bus communicatively couples the rack equipment and the application performance modification component and the communication bus communicates information between the application performance modification component and the rack equipment.

BRIEF DESCRIPTION OF THE DRAWINGS

The accompanying drawings, which are incorporated in and form a part of this specification, illustrate embodiments of the invention by way of example and not by way of limitation. The drawings referred to in this specification should be understood as not being drawn to scale except if specifically noted.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it is understood the present invention may be practiced without these specific details. In other instances, some readily understood methods, procedures, components, and circuits have not been described in detail as not to unnecessarily obscure aspects of the current invention.

The present invention facilitates allocation of rack equipment performance capabilities based upon application information processing performed by the rack equipment. A present invention application performance modification system and method controls modification to performance levels of rack equipment. In one exemplary implementation, an application performance modification system includes a protocol and link for communicating rack equipment performance information and rack budget allocation directions for rack equipment. An application performance modification system can also control modification of support equipment performance levels (e.g., HVAC controls). For example, the application performance modification system can permit a greater portion of a rack power and thermal budget to be allocated to and consumed by rack equipment implementing a high priority application than rack equipment implementing a low priority application. The performance levels (e.g., frequency and voltage) of rack equipment can be modified to correspond with the power and thermal budget allocation.

Figure 1:
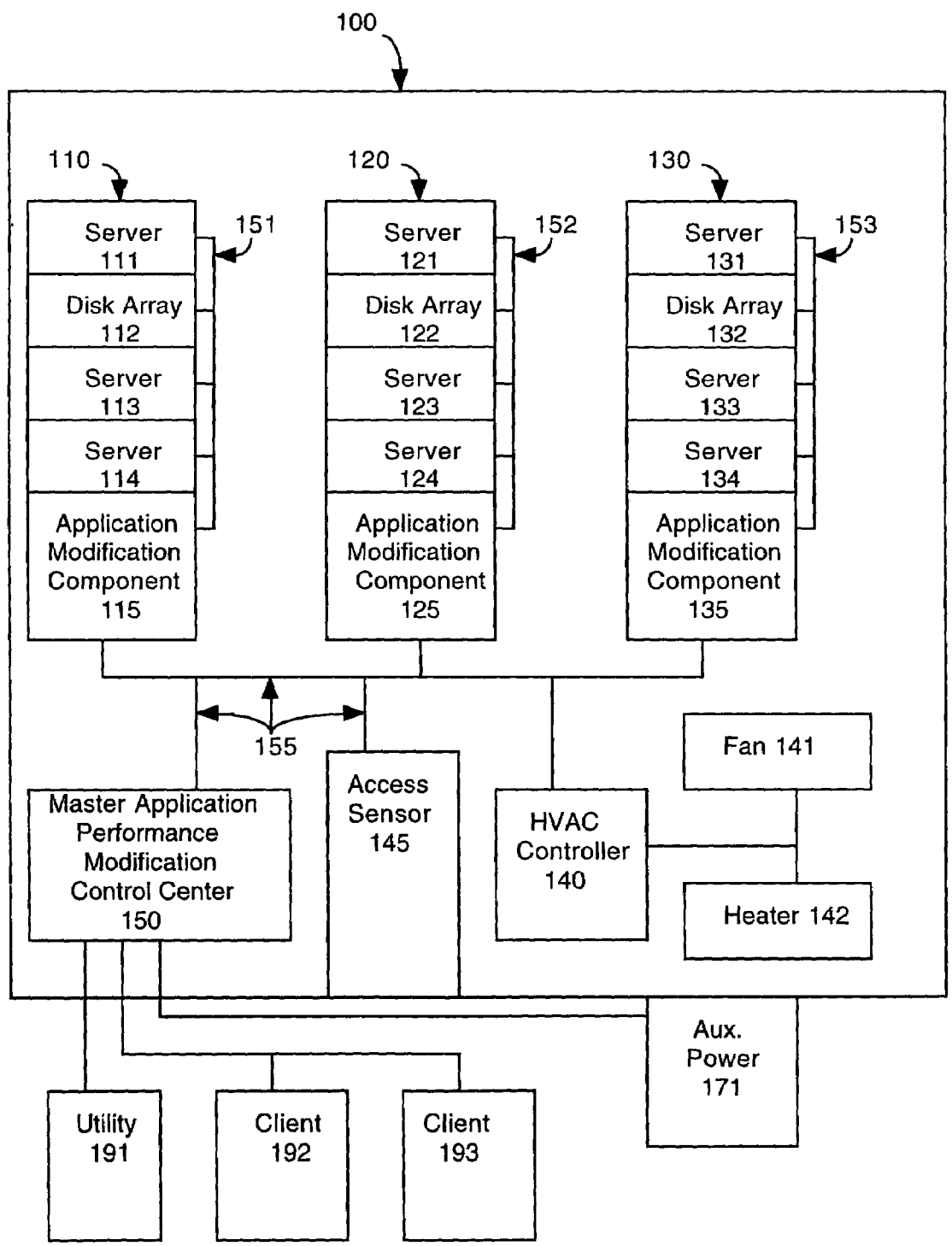
FIG. 1 is an illustration of a rack equipment application performance modification system in accordance with one embodiment of the present invention

FIG. 1 is an illustration of rack equipment application performance modification system 100, one embodiment of the present invention. Rack equipment application performance modification system 100 includes a plurality of racks 110, 120, and 130, master application performance modification control center 150, access sensor 145, and heating, venting and cooling (HVAC) controller 140. Equipment racks 110, 120 and 130 comprise servers 111 through 134, disk arrays 112, 122 and 132, and application performance modification components 115, 125 and 135 respectively. Master application performance modification control center 150 is communicatively coupled to equipment racks 110, 120, and 130, and HVAC controller 140 through communications channel 155.

The components of rack equipment application performance modification system 100 cooperatively operate to process information and manage equipment included in system 100. The plurality of servers 111 through 134 process information. Disk arrays 112, 122 and 132 store information for processing. Application performance modification components 115, 125 and 135 modify performance of the rack equipment included in equipment racks 110, 120, and 130 based upon an application running on the rack equipment. Master application performance modification control center 150 coordinates the performance modification between racks 110, 120 and 130 and equipment that supports operations of multiple racks (e.g., HVAC controller 140). Master application performance modification control center 150 also receives application related performance modification information from processing clients 192 and 193. HVAC controller 140 controls the heating (e.g., heater 142), venting (e.g., fan 141) and cooling equipment (e.g., an air conditioning unit) associated with a room in which equipment racks 110, 120 and 130 are located.

The communication links included in rack equipment application performance modification system 100 communicate information between components of system 100. Communication link 151 communicatively couples application performance modification component 115 to other equipment (e.g., server 111, 113 and 114 and disk array 112) in rack 110 (e.g., server 111, 113 and 114 and disk array 112). Communication link 152 communicatively couples application performance modification component 125 to other equipment in rack 120. Communication link 153 communicatively couples application performance modification component 135 to other equipment in rack 130. Communication link 155 communicatively couples master application performance modification control center 150, application performance modification components 115, 125, and 135, access sensor 145 and HVAC controller 140. There are a variety of configurations that are compatible with present invention communication links. A present invention communication link can be established by "injecting" (e.g., modulating) a signal on a power cord (e.g., AC or DC line cord), an RS-485 system an Ethernet10/100/1000bT local area network (LAN) and/or Wireless Communications Channels.

Equipment included in rack equipment application performance modification system 100 is controlled by application performance modification components 115, 125, 135 and master application performance modification component 150 in accordance with an application performance assignment guideline or plan which sets forth rack equipment performance for an application. The application performance assignment guideline allocates a portion of a rack power budget for an application. Maintaining rack equipment operation within the power consumption and heat dissipation budget permits maximization of the resulting tradeoff between performance and power consumption/thermal dissipation with respect to application assignment. The application performance assignment guideline can be dynamically adjusted on the fly.

With reference still to FIG. 1, there are a variety of ways in which master application performance modification control center 150 and application performance modification components 115, 125 and 135 can modify performance of the equipment included in rack equipment management system 100. In one embodiment of the present invention, application performance modification components 115, 125 and 135 control performance modifications to rack equipment frequency and operating voltage. Application performance modification components 115, 125 and 135 can also turn on or off rack equipment included in racks 110 through 130 respectively. Alternatively, application performance modification components 115, 125 and 135 can instruct execution components (e.g., parallel processors, pipelines, etc.) and/or portions of a memory component (e.g., a disk array, etc.) to turn on or off. Master application performance modification control center 150 and application performance modification components 115, 125 and 135 can also control performance modification of support equipment (e.g., fan 141, heater 142, auxiliary power unit 171, etc.).

Application performance modification components (e.g., 115, 125, 135 and/or 150) can also comprise an interface for facilitating user interaction with rack equipment application performance modification operations. The interface allows operators or other equipment (e.g., remote resources coupled via a network) to manually and/or automatically participate in performance level allocation for rack equipment implementing various applications. The interface is a mechanism for communicating information to and from an operator or user. For example, the interface can enable operator intervention and provides a variety of application and performance related information in a cohesive user friendly presentation.

Figure 2:
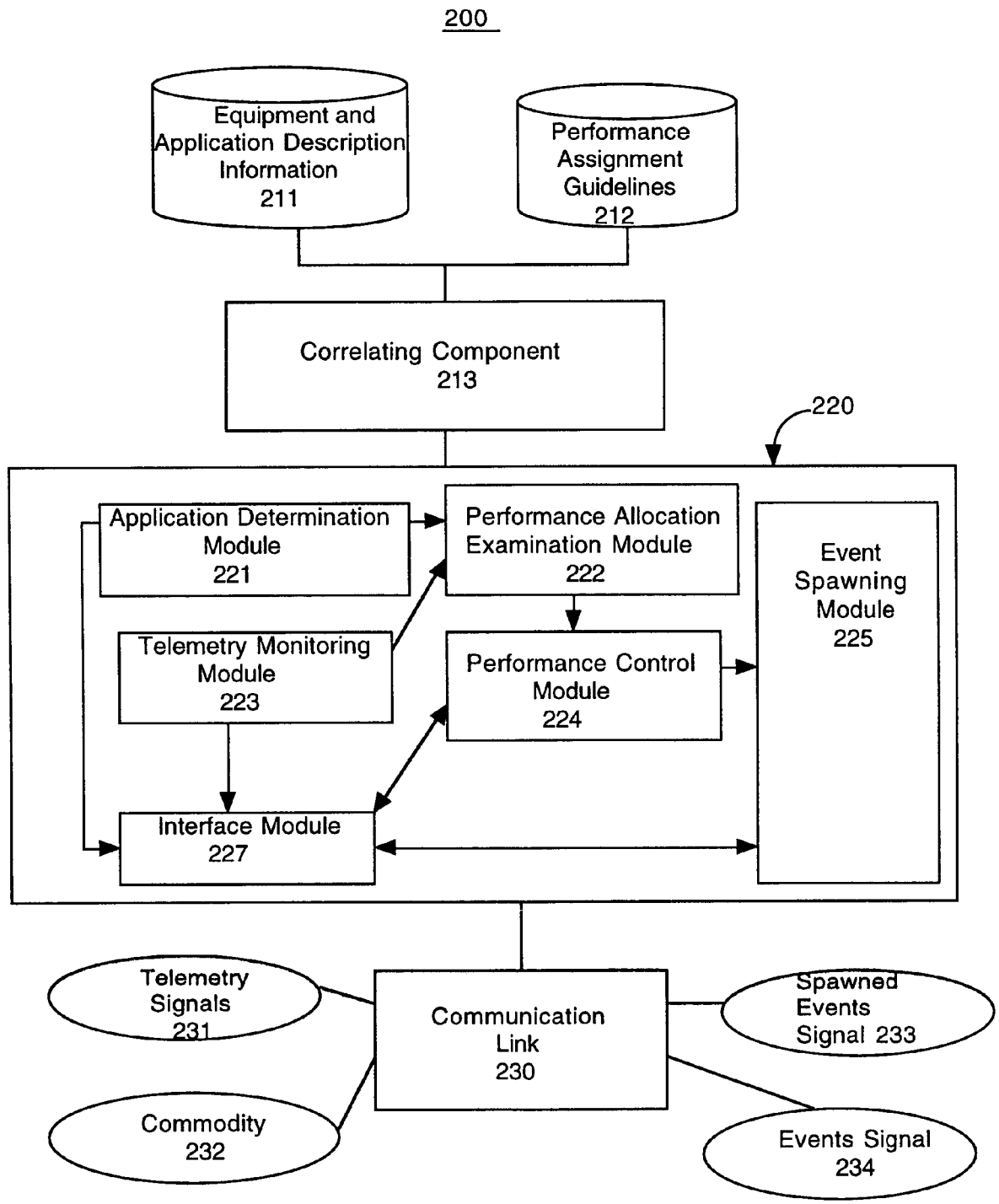
FIG. 2 is an illustration of one embodiment of a present invention application performance modification component.

FIG. 2 is an illustration of application performance modification component 200, one embodiment of a present invention application performance modification component. Application performance modification component 200 includes rack equipment description and application information 211, application performance assignment guidelines 212, correlating component 213, application performance processing component 220, and communication component 230. The components of application performance modification component 200 cooperatively operate to modify rack equipment performance based upon an application running on the rack equipment. Rack equipment description and application information 211 stores information describing equipment included in a rack and applications running on that equipment. Application performance assignment guidelines 212 includes guidelines on performance level assignments for particular applications. Correlating component 213 correlates information from rack equipment description and application information 221 and application performance assignment guidelines 212. Application performance processing component 220 processes directions for modifying performance of rack equipment according to the rack equipment application performance assignment guidelines. Application performance modification component 200 utilizes communication link 230 for external communications (e.g., telemetry signals 231, commodity signals 232, spawned event signals 233 and trigger event signals 234).

The information storage features of application performance modification component 200 are readily adaptable for a variety of information storage configurations. For example, the storage features are capable of storing various different information associated with rack equipment description and application information 211 and application performance assignment guidelines 212. Rack equipment description and application information 211 can include rack equipment features and characteristics (e.g., operation settings) and application priority indications. For example, high priority applications (e.g., including critical application activities run in real time) can be given a high priority indication and less critical application activities (e.g., that can cope with delayed processing) can be given a lower priority indication. Application performance assignment guidelines 212 provide an association between an application and a performance level. For example, an application with a high priority is associated with a high performance level and an application with a low priority is associated with a low performance level. Correlating component 213 correlates the rack equipment description information and the application performance assignment guideline information.

Application performance processing component 220 includes application determination module 221, performance allocation examination module 222, performance control module 224, application event spawning module 225, telemetry monitoring module 223, and interface module 227. Application determination module 221 determines if an application is implemented on rack equipment. Performance allocation examination module 222 examines performance allocation information associated with the application. Performance control module 224 controls performance adjustments in accordance with application performance assignment guidelines. Application event spawning module 225 generates application related performance events. Telemetry monitoring module 223 monitors characteristics and activity of the rack equipment associated with the application implementation. Interface module 227 executes interface operations.

Application determination module 221 determines or identifies which applications are implemented on the rack equipment and also identifies a variety of different potential application performance modification trigger events. Application performance modification trigger events can include events associated with an application performance assignment guideline. For example, if an application is just running in the background and an indication of an event causing the application to run in real time is received, application determination module recognizes the event as potentially being associated with an application performance assignment guideline. Application determination module 221 forwards the indication of a potential application performance modification triggering event to performance allocation examination module 222. Telemetry monitoring module 223 can forward telemetry related information to application determination module 221 and application determination module 221 can determine if the telemetry information indicates the occurrence of an application performance modification triggering event.

Performance allocation examination module 222 examines the performance level indicated by an application performance assignment guideline (e.g. 212) for modification trigger events. In one exemplary implementation, performance allocation examination module 222 analyzes the performance frequency and voltage levels an application performance assignment guideline associates with a particular application. The performance allocation examination module 222 can determine if the occurrence of a particular performance modification application trigger event (e.g., detected by application determination module 221) gives rise to an application performance assignment guideline dictated modification in a performance level (e.g., turning on or off an execution unit) of a particular piece of rack equipment. The performance allocation examination module 222 forward results of the examination to performance control module 224.

Telemetry collection module 223 can be utilized to direct the collection of telemetry information associated with various different rack equipment and applications. For example, telemetry collection module 223 is readily adaptable for utilization with different information processing related devices, including different types and brands of servers, routers and disk arrays. Telemetry collection module 223 is also readily adaptable for utilization with a variety of different rack equipment operation support devices, including HVAC controllers and auxiliary power supplies. Telemetry collection module 223 can also direct collection or retrieval of information for confirming performance adjustment commands are complied with. Telemetry module 223 can also direct retrieval of rack equipment description information (e.g., rack equipment operation settings and performance levels).

Performance control module 224 is capable of controlling performance adjustments in accordance with a variety of application performance assignment guidelines. In one exemplary implementation, performance control module 224 retrieves particular rack equipment configured instructions from equipment and application description information (e.g., included in equipment and application description information 212). The directions can include adjustments in rack equipment and/or support equipment performance levels. For example, the directions can be associated with a power consumption setting and/or heat dissipation level that is associated with a particular application. The directions can also include adjustments to the operating frequency of the rack equipment and/or voltage of supply power to rack equipment, turn on/off an execution component within rack equipment, and adjustments to support equipment (e.g., fan 141, heater 142, auxiliary power unit 171, etc.).

Event spawning module 225 spawns application performance modification events. For example, event spawning module 225 can spawn an application performance modification triggering event that causes an application performance modification component to interface with other application performance modification components and/or rack equipment under the control of other application performance modification components, clients, and/or external support operations (e.g., a power utility). In another example, master application performance modification control center 150 can receive communications from power utility 191, information client 192 and/or client 193 and spawn an application performance modification triggering event indication to application performance modification component 115, 125 and/or 135. For example, client 192 can communicate a desire to change the priority of an application and master application performance modification control center 150 can spawn an application performance modification triggering event for application performance modification component 115 to alter the performance of rack equipment implementing the application.

In one embodiment of the present invention, an application performance modification component (e.g., 115) is included in an intelligent power distribution unit (IPDU). The IPDU can be utilized to aggregate multiple power line cords from rack equipment into a smaller number of power line cords at a rack level. In an implementation in which power cords are used as a present invention communication link, the presence of each piece of rack equipment can be detected as the rack equipment is communicatively coupled to the IDPU. In addition, rack equipment description and application information associated with the piece of rack equipment can be automatically communicated to the IPDU.

Figure 3:
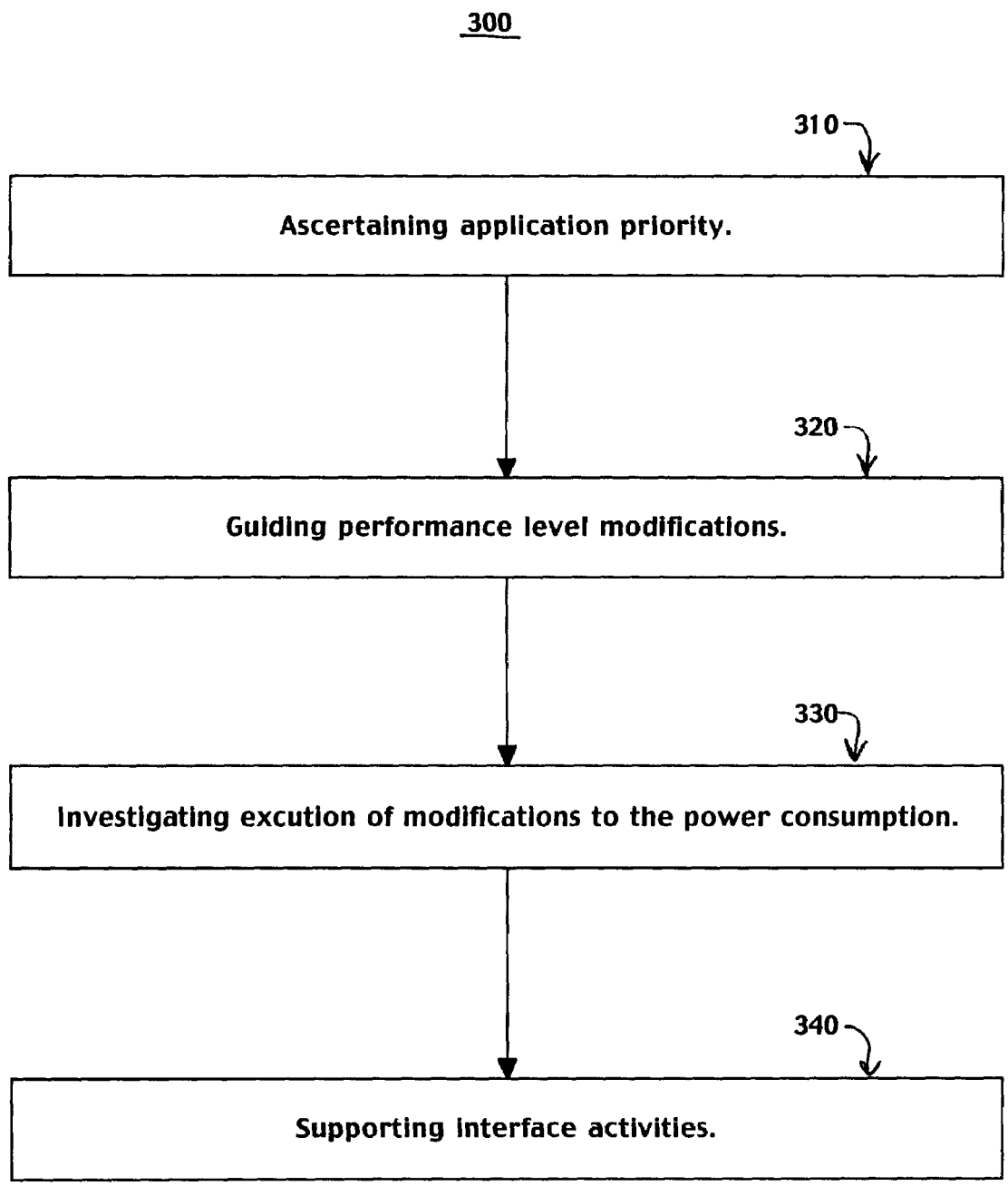
FIG. 3 is a flow chart of a rack equipment application performance allocation method in accordance with one embodiment of the present invention.

FIG. 3 is a flow chart of a rack equipment application performance allocation method 300 in accordance with one embodiment of the present invention. Rack equipment application performance allocation method 300 establishes an allocation of rack equipment performance capabilities in accordance with applications implemented on the rack equipment. The allocation of capabilities can include allocating a percentage of power consumption and thermal dissipation budget. For example, the percentage of power consumption and thermal dissipation budget can be allocated based upon the priority of an application. Application performance allocation method 300 can provide an interface for presenting application and rack equipment performance information to an operator in a user friendly manner.

In step 310, application priority is ascertained. The priority can range from high priority to a low priority and can be segmented into varying multiple priority levels. In one embodiment, the priority of an application is automatically detected. For example, the amount of input/output traffic associated with an application is automatically detected and a priority determination is made. Applications with a comparatively large amount of input/output traffic (e.g., compared to other applications implemented by the rack equipment) can be assigned a high priority and applications with a comparatively small amount of input/output traffic can be assigned a low priority. The application priority information can also be ascertained by accessing application priority indication information stored in a memory (e.g., equipment and application description information 211).

Performance level modifications are guided in step 320. A performance level associated with a rack equipment budget is altered. For example, apportionment of a rack equipment budget characteristic based upon the application priority is guided. The alteration can include increasing or decreasing a voltage and frequency of rack equipment associated with the application processing. Information included in an application performance assignment guideline or plan can be utilized to provide a correlation between the apportionment and the application. The apportionment can correspond to an agreement between a client and a host and can be changed interactively.

In step 330, execution of the modification to said power consumption is investigated. The performance levels of rack equipment are reviewed after the adjustment directions are issued to ensure the adjustments are implemented. For example, performance related setting information (e.g., the voltage and frequency level) returned in response to a telemetry component inquiry are compared to adjustment directions issued in step 320.

In step 340, interface activities are supported. The interface activities include presenting information in a convenient and user friendly manner. For example, application performance guideline information, rack equipment description information and telemetry information (e.g., operating level settings) can be displayed. Similar information associated with rack support equipment (e.g., HVAC equipment, auxiliary power, etc.) can also be displayed. The interface activities can also support automatic adjustment of application performance guideline information.

Figure 4:
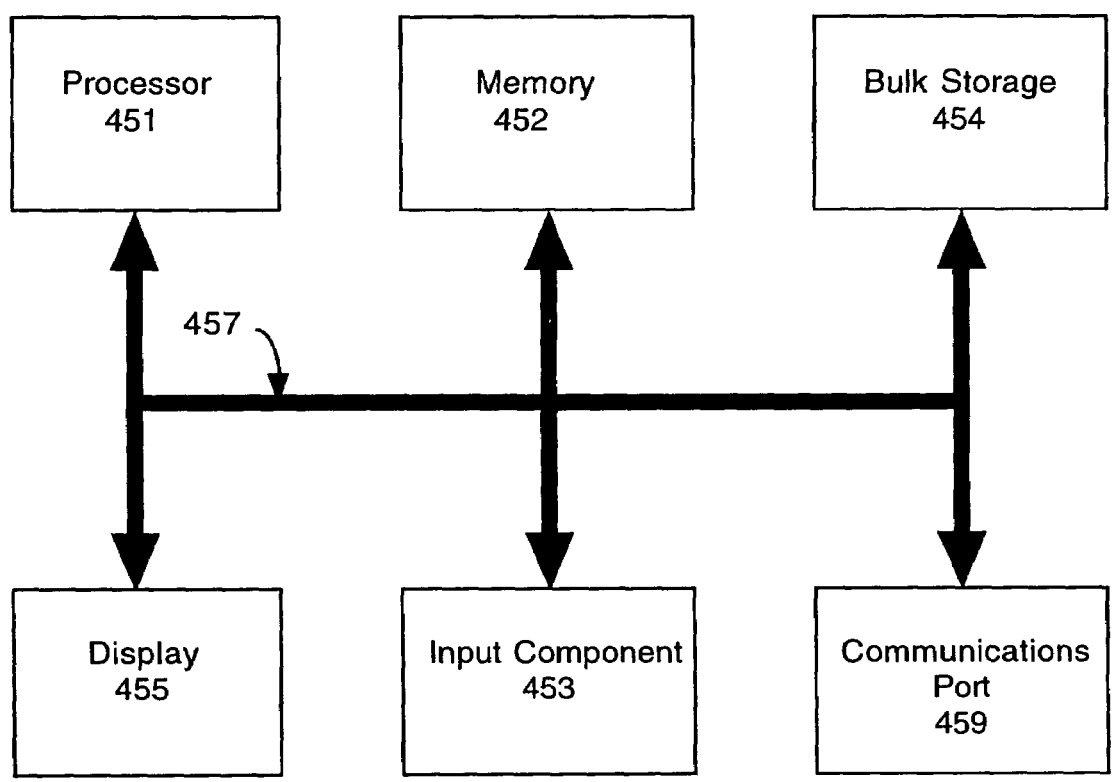
FIG. 4 is a block diagram of one embodiment of a computer system on which the present invention can be implemented.

FIG. 4 is a block diagram of computer system 400, one embodiment of a computer system on which the present invention can be implemented. For example, computer system 400 can be utilized to implement application performance modification component 200 or application performance allocation method 300. Computer system 400 includes communication bus 457, processor 451, memory 452, input component 453, bulk storage component 454 (e.g., a disk drive), network communication port 459 and display module 455. Communication bus 457 is coupled to central processor 451, memory 452, input component 453, bulk storage component 454, network communication port 459 and display module 455.

The components of computer system 400 cooperatively function to provide a variety of functions, including performing rack equipment management in accordance with the present invention. Communication bus 457 communicates equipment rack management related information within computer system 400. Processor 451 processes information and instructions, including instructions and information for modifying rack equipment performance levels based upon an application the rack equipment is running. For example, instructions included in determination module 221, performance allocation examination module 222, performance control module 224, application event spawning module 225, telemetry monitoring module 223, and interface module. Memory 452 stores information and instructions, including instructions for implementing an application performance assignment guideline. Bulk storage component 454 also provides storage of information (e.g., rack equipment description information, policy information, etc.). A present invention interface can by implemented by input component 453, display module 455 and network communications port 459. Input component 453 facilitates communication of information (e.g., with an application performance assignment guideline information, application information, etc.) to computer system 400. Display module 455 displays information to a user (e.g., a graphical user interface conveying rack equipment performance levels, rack equipment description information, application information, etc.). Network communication port 459 provides a communication port for communicatively coupling with a network (e.g., for communicating with a client, a utility, a remote operator and/or control center, etc.).

Thus, a present invention rack equipment application performance modification system and method facilitates convenient and efficient modification of rack equipment operation characteristics based upon an application performance assignment guideline. The rack equipment application performance assignment guideline permits automated adjustment to rack equipment support functions according to the importance and/or complexity of an application. For example, equipment operation setting and performance level adjustments can be automatically implemented in accordance with application priority (e.g., performance level setting can be increase for high priority applications and decreased for low priority applications. The performance level adjustments can be set to conserve limited power consumption and heat dissipation budget provisions for important and/or critical activities and achieve an efficient balance between budget constraints and performance.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various modifications as are suited to the particular use contemplated. It is intended that the scope of the invention be defined by the claims appended hereto and their equivalents.

What is claimed is:

1. An application server management system comprising:
rack equipment for processing information;
an application performance modification component for automatically modifying performance of said rack equipment based upon an application; and
a communication bus for communicatively coupling said rack equipment and said application performance modification component, wherein said communication bus communicates information between said application performance modification component and said rack equipment, wherein said automatically modifying permits consumption of a greater portion of a rack power budget by rack eguipment implementing a high priority application than rack eguipment implementing a low priority application.

2. An application server management system of claim 1 wherein said application performance modification component modifies a performance frequency and voltage of said rack equipment.

3. An application server management system of claim 1 wherein an application performance assignment guideline sets forth rack equipment performance for a particular application.

4. An application server management system of claim 3 wherein said application performance assignment guideline allocates a portion of a rack power budget for said particular application.

5. An application server management system of claim 1 wherein an application performance assignment guideline is dynamically adjustable on the fly.

6. An application server management system of claim 1 wherein said modification is maintained within a rack power consumption and thermal budget.

7. An application performance allocation method comprising:
ascertaining application priority;
guiding apportionment of a rack equipment budget characteristic based upon said application priority, wherein a greater amount of a rack power budget for said rack eguipment budget characteristic is automatically apportioned to a high priority application than to a low priority application; and
investigating execution of an alteration to said rack equipment budget characteristic to enable alteration of said amounts apportioned to said high priority application and said low priority application.

8. An application performance allocation method of claim 7 wherein a performance level associated with a rack equipment budget is altered.

9. An application performance allocation method of claim 7 wherein said alteration includes turning a voltage and frequency of rack equipment associated with said application processing.

10. An application performance allocation method of claim 7 further comprising providing a correlation between said apportionment and said applications.

11. An application performance allocation method of claim 7 wherein said apportionment corresponds to an agreement between a client and a host.

12. An application performance allocation method of claim 7 wherein said apportionment between said applications is changed interactively.

13. A computer usable storage medium having computer readable program code embodied therein for causing a computer system to implement application based performance modification instructions comprising:
   an application determination module for determining an implementation of an application on rack equipment;
   a performance allocation examination module for examining performance allocation information associated with said application; and
   a performance control module for controlling performance modulation in accordance with an application performance assignment guideline.

14. A computer usable storage medium of claim 13 further comprising an application event spawning module for generating application events.

15. A computer usable storage medium of claim 13 further comprising a telemetry monitoring module for monitoring characteristics and activity of said rack equipment associated with said application.

16. A computer usable storage medium of claim 13 wherein said performance allocation information indicates power consumption and thermal dissipation budget allocation.

17. A computer usable storage medium of claim 16 wherein said performance control module controls performance adjustments in accordance with said power consumption and thermal dissipation budget allocation.

18. A computer usable storage medium of claim 13 wherein said application performance assignment guideline includes tradeoffs in the percentage of power consumption and thermal dissipation budget allocated to particular pieces of rack equipment in accordance with the business priority a client attaches to said application.

19. A computer usable storage medium of claim 13 wherein said application performance assignment guideline balances rack equipment power and thermal budget limitations on particular pieces of said rack equipment.

* * * * *

UNITED STATES PATENT AND TRADEMARK OFFICE
CERTIFICATE OF CORRECTION

| | |
|---|---|
| PATENT NO. | : 7,146,511 B2 |
| APPLICATION NO. | : 10/681721 |
| DATED | : December 5, 2006 |
| INVENTOR(S) | : Andrew Harvey Barr et al. |

Page 1 of 1

It is certified that error appears in the above-identified patent and that said Letters Patent is hereby corrected as shown below:

In column 10, line 30, in Claim 1, delete "eguipment" and insert -- equipment --, therefor.

In column 10, line 31, in Claim 1, delete "eguipment" and insert -- equipment --, therefor.

In column 10, line 58, in Claim 7, delete "eguipment" and insert -- equipment --, therefor.

Signed and Sealed this

Twenty-second Day of December, 2009

David J. Kappos
*Director of the United States Patent and Trademark Office*